US012794930B2

(12) United States Patent
Barrios et al.

(10) Patent No.: US 12,794,930 B2
(45) Date of Patent: Nov. 10, 2026

(54) DYNAMIC APPROACH TO REAL-TIME CVE/CWE ANALYSIS DURING CYBERSECURITY THREAT ANALYSIS AND RISK ASSESSMENT (TARA)

(71) Applicant: Robert Bosch GmbH, Stuttgart (DE)

(72) Inventors: Rita Barrios, Plymouth, MI (US); Zhenan Ma, Plymouth, MI (US); Jan Reinhardt, Plymouth, MI (US); Michael Tucci, Westland, MI (US)

(73) Assignee: Robert Bosch GmbH, Stuttgart (DE)

( * ) Notice: Subject to any disclaimer, the term of this patent is extended or adjusted under 35 U.S.C. 154(b) by 83 days.

(21) Appl. No.: 19/003,312

(22) Filed: Dec. 27, 2024

(65) Prior Publication Data

US 2026/0189589 A1 Jul. 2, 2026

(51) Int. Cl.
*H04L 9/40* (2022.01)
*H04L 41/16* (2022.01)

(52) U.S. Cl.
CPC .......... *H04L 63/1433* (2013.01); *H04L 41/16* (2013.01)

(58) Field of Classification Search
CPC .............................. H04L 63/143; H04L 41/16
See application file for complete search history.

(56) References Cited

U.S. PATENT DOCUMENTS 11,201,893 B2 12/2021 Kruse et al.
11,863,578 B1 1/2024 Speck et al.
2009/0327943 A1 12/2009 Medvedev et al.
2017/0091459 A1* 3/2017 Childress .............. G06F 21/577
2021/0392153 A1* 12/2021 Bubshait ................... G06F 8/65
2023/0019180 A1 1/2023 de Nijs et al.
2024/0422187 A1* 12/2024 Shah ....................... G06F 40/56
2025/0317464 A1* 10/2025 Mehrotra ............ H04L 63/1416
2026/0133568 A1* 5/2026 Pochaiah ......... G05B 19/41885

OTHER PUBLICATIONS

Richardson et al., "Applying Generative AI for CVE Analysis at an Enterprise Scale," <https://developer.nvidia.com/ blog/applying-generative-ai-for-cve-analysis-at-an-enterprise-scale/> article dated May 24, 2024 (14 pages).

(Continued)

*Primary Examiner* — Matthew T Henning
(74) *Attorney, Agent, or Firm* — Michael Best & Friedrich LLP

(57) ABSTRACT

Apparatus and methods for updating a computer system security analysis framework and performing a vulnerability analysis. One example apparatus includes an electronic processor configured to identify one or more assets associated with a security analysis target that includes a security analysis framework by scanning a target system architecture and a plurality of security-relevant components. The security analysis target is operated using the target system architecture. The electronic processor is configured to execute a large language model to process the identified assets by generating a search pattern based on a technical context of the identified one or more assets, selecting a relevant vulnerability based on the search pattern, and determining a mitigation strategy based on the relevant vulnerability. The electronic processor updates the security analysis framework by adding the relevant vulnerability and the mitigation strategy into the security analysis framework.

20 Claims, 11 Drawing Sheets

(56) References Cited

OTHER PUBLICATIONS

Utter, “Leveraging Generative Al for Advanced Vulnerability Management,” <https://www.linkedin.com/pulse/ leveraging-generative-ai-advanced-vulnerability-management-utter-giucc/> article dated Sep. 9, 2024 (7 pages).
Duarte et al., “Applying Generative AI to CVE remediation—early vulnerability patching in Continuous Integration Pipelines,” <https://aws.amazon.com/blogs/containers/applying-generative-ai-to-cve-remediation-early-vulnerability-patching-in-continuous-integration-pipelines/> article dated Apr. 19, 2024 (5 pages).

* cited by examiner

Assets ? x

| Id | Name | Security properties | TO... Description |
|---|---|---|---|
| Ast-1 | External Ethernet Configuration | Integrity | Configuration of the external Ethernet connection. External as in the interfa |
| Ast-2 | SW Update Configuration | Integrity, Availability | SW Update Configuration, e.g., FOTA... |
| Ast-3 | CAN-FD Configuration | Integrity | CAN-FD Configuration, e.g., which messages to process, send... |
| Ast-4 | HSM Keystore | Confidentiality, Integrity, Availab | Keystore of the HSM. |
| Ast-5 | JTAG Configuration | Integrity | JTAG Configuration. |
| Ast-6 | ECU feature and capability set | Integrity | Feature set of ACP part of the Toliman ECU. Could differ based on features |
| Ast-7 | SPI Configuration | Integrity | SPI Configuration. |
| Ast-8 | I2C Configuration | Integrity | I2C Configuration. |
| Ast-12 | PCIe Configuration | Integrity | SSD connected via PCIe was cut from concept. PCIe interface must be disa |
| Ast-14 | CSI Configuration | Integrity | Camera Serial Interface Configuration. |
| Ast-16 | FPD-Link Configuration | Integrity | Flat Panel Display Link Configuration. |
| Ast-17 | SGMII Configuration | Integrity | Serial Gigabit Media Independent Interface Configuration. |
| Ast-18 | MDIO Configuration | Integrity | Management Data Input/Output Configuration. |
| Ast-20 | CAN-FD Signals | Integrity, Availability | Signals transmitted via CAN-FD that are not Safety-critical and do not contai |
| Ast-21 | CAN-FD Safety Signals | Integrity, Availability | Signals transmitted via CAN-FD that are Safety-critical. |
| Ast-22 | External Ethernet Signals | Integrity, Availability | Signals transmitted via external Ethernet that are not Safety-critical and do |
| Ast-23 | External Ethernet Safety Signals | Integrity, Availability | Signals transmitted via external Ethernet that are Safety-critical. |

200

FIG. 2

| | | |
|---|---|---|
| **CVE-2021-27502** | Texas Instruments TI-RTOS, when configured to use HeapMem heap(default), malloc returns a valid pointer to a small buffer on extremely large values, which can trigger an integer overflow vulnerability in 'HeapMem_allocUnprotected' and result in code execution.<br>**Published:** November 21, 2023; 1:15:07 PM -0500 | *V4.0:*(not available)<br>*V3.1:* 7.8 HIGH<br>*V2.0:*(not available) |
| **CVE-2021-27429** | Texas Instruments TI-RTOS returns a valid pointer to a small buffer on extremely large values. This can trigger an integer overflow vulnerability in 'HeapTrack_alloc" and result in code execution.<br>**Published:** November 20, 2023; 2:15:08 PM-0500 | *V4.0:*(not available)<br>*V3.1:* 7.8 HIGH<br>*V2.0:*(not available) |

CVE

CVE List ▾ CNAs ▾ WGs ▾ Board ▾ About ▾ News ▾

Search CVE List Downloads Data Feeds Update a CVE Record Request CVE IDs

TOTAL CVE Records: 240830

NOTICE: Transition to the all-new CVE website at WWW.CVE.ORG and CVE Rcord Format JSON are underway.

NOTICE: Support for the legacy CVE download formats ended on June 30, 2024,
New CVE List download format is available now on CVE.ORG.

HOME > CVE > SEARCH RESULTS

Search Results

There are 22 CVE Records that match your search.

| Name | Description |
|---|---|
| CVE-2023-29468 | The Texas Instruments (TI) WiLink WL18xx MCP driver does not limit the number of information elements (IEs) of type XCC_EXT_1_IE_ID or XCC_EXT_2_IE_ID that can be parsed in a management frame. Using a specially crafted frame, a buffer overflow can be triggered that can potentially lead to remote code execution. This affects WILINK8-WIFI-MCP8 version 8.5_SP3 and earlier. |

FIG. 3 (Continued)

| | |
|---|---|
| CVE-2022-48803 | In the Linux kernel, the following vulnerability has been resolved: phy: ti: Fix missing sentinel for clk_div_table _get_table_maxdiv() tries to access "clk_div_table" array out of bound defined in phy-j721e-wiz.c. Add a sentinel entry to prevent the following global-out-of-bounds error reported by enabling KASAN. [9.552392] BUG: KASAN: global-out-of-bounds in _get_maxdiv+0xc0/0x148 [9.558948] Read of size 4 at addr ffff8000095b25a4 by task kworker/u4:1/38 [9.565926] [9.567441] CPU: 1 PID: 38 Comm: kworker/u4:1 Not tainted 5.16.0-116492-gdaadb3bd0e8d-dirty #360 [9.576242] Hardware name: Texas Instruments J721e EVM (DT) [9.581832] Workqueue: events_unbound deferred_probe_work_func [9.587708] Call trace: [9.590174] dump_backtrace+0x20c/0x218 [9.594038] show_stack+0x18/0x68 [9.597375] dump_stack_lvl+0x9c/0xd8 [9.601062] print_address_description.constprop.0+0x78/0x334 [9.606830] kasan_report+0x1f0/0x260 [9.610517]_asan_load4+0x9c/0xd8 [9.614030]_get_maxdiv+0xc0/0x148 [9.617540] divider_determine_rate+0x88/0x488 [9.622005] divider_round_rate_parent+0xc8/0x124 [9.626729] wiz_clk_div_round_rate+0x54/0x68 [9.631113] clk_core_determine_round_nolock+0x124/0x158 [9.636448] clk_core_round_rate_nolock+0x68/0x138 [9.641260] clk_core_set_rate_nolock+0x268/0x3a8 [9.645987] clk_set_rate+0x50/0xa8 [9.649499] cdns_sierra_phy_init+0x88/0x248 [9.653794] phy_init+0x98/0x108 [9.657046] cdns_pcie_enable_phy+0xa0/0x170 [9.661340] cdns_pcie_init_phy+0x250/0x2b0 [9.665546] j721e_pcie_probe+0x4b8/0x798 [9.669579] platform_probe+0x8c/0x108 [9.673350] really_probe+0x114/0x630 [9.677037]_driver_probe_device+0x18c/0x220 [9.681505] driver_probe_device+0xac/0x150 [9.685712] __ device_attach_driver+0xec/0x170 [9.690178] bus_for_each_drv+0xf0/0x158 [9.694124] __ device_attach+0x184/0x210 [9.698070] device_initial_probe+0x14/0x20 [9.702277] bus_probe_device+0xec/0x100 [9.706223] deferred_probe_work_func+0x124/0x180 [9.710951] process_one_work+0x4b0/0xbc0 [9.714983] worker_thread+0x74/0x5d0 [9.718668] kthread+0x214/0x230 [9.721919] ret_from_fork+0x10/0x20 [9.725520] [9.727032] The buggy address belongs to the variable: [9.732183] clk_div_table+0x24/0x440 |
| CVE-2022-25334 | The Texas Instruments OMAP L138 (secure variants) trusted execution environment (TEE) lacks a bounds check on the signature size field in the SK_LOAD module loading routine, present in mask ROM. A module with a sufficiently large signature field causes a stack overflow, affecting secure kernel data pages. This can be leveraged to obtain arbitrary code execution in secure supervisor context by overwriting a SHA256 function pointer in the secure kernel data area when loading a forged, unsigned SK_LOAD module encrypted with the CEK (obtainable through CVE-2022-25332). This constitutes a full break of the TEE security architecture. |
| CVE-2022-25333 | The Texas Instruments OMAP L138 (secure variants) trusted execution environment (TEE) performs an RSA check implemented in mask ROM when loading a module through the SK_LOAD routine. However, only the module header authenticity is validated. An adversary can re-use any correctly signed header and append a forged payload, to be encrypted using the CEK (obtainable through CVE-2022-25332) in order to obtain arbitrary code execution in secure context. This constitutes a full break of the TEE security architecture. |
| CVE-2022-25332 | The AES implementation in the Texas Instruments OMAP L138 (secure variants), present in mask ROM, suffers from a timing side channel which can be exploited by an adversary with non-secure supervisor privileges by managing cache contents and collecting timing information for different ciphertext inputs. Using this side channel, the SK_LOAD secure kernel routine can be used to recover the Customer Encryption Key (CEK). |

300

FIG. 3 (Continued)

DYNAMIC APPROACH TO REAL-TIME CVE/CWE ANALYSIS DURING CYBERSECURITY THREAT ANALYSIS AND RISK ASSESSMENT (TARA)

CROSS-REFERENCE TO RELATED APPLICATIONS

Not applicable.

TECHNICAL FIELD

The present disclosure relates generally to cybersecurity threat analysis and risk assessment (TARA) systems, and more specifically, to automated real-time vulnerability analysis using large language models (LLMs) for identifying and evaluating security vulnerabilities in target systems.

BACKGROUND

Modern computing systems combine various hardware and software components that work together to perform specific functions. These systems require cybersecurity measures to protect against potential threats that may compromise the operation or data. In cybersecurity practice to protect against the potential threats, security vulnerabilities are documented and tracked through standardized catalogs of publicly disclosed cybersecurity vulnerabilities. The standardized catalogs include common vulnerabilities and exposures (CVE) and common weakness enumeration (CWE). The CVE records identify specific, known security weaknesses in hardware or software products. The CWE records describe categories of potential security flaws. These standardized catalogs are used for identifying and analyzing potential threats to system components.

TARA is a method or process for examining the computing systems to identify potential security vulnerabilities, evaluate the vulnerabilities' impact, and develop protective measures. While existing safety analysis focuses on preventing accidental system failures or hazards, the TARA method specifically addresses intentional attempts to exploit system weaknesses. For example, the TARA process examines how attackers may attempt to compromise system security and what measures can prevent such attacks. The TARA method incorporates analyzing the vulnerabilities documented in the standardized catalogs including the CVE/CWE, and consulting databases that contain information about known security weaknesses and recommended protective measures.

SUMMARY

As computing systems have grown more complex, TARA processes face increasing technical challenges in data processing and analysis. For example, industry standards require security analysis as part of system development and maintenance, particularly in sectors where security is critical. A TARA process may thus require regular updates to reflect system modifications and newly discovered security threats. However, modern computing systems often integrate numerous interconnected hardware and software components, each with potential security implications. When analyzing such systems, a TARA process needs to examine a rapidly expanding volume of security vulnerability data across multiple databases, each using different data formats and classification schemes.

The technical process of querying vulnerability databases and identifying relevant security weaknesses has become computationally intensive. According to existing methods, an analysis system may need to perform multiple database queries for each component, process various data formats, interpret technical specifications, and determine relevance to specific system configurations. This search process faces technical limitations in processing efficiency, data interpretation accuracy, and real-time analysis capability. For example, a single embedded system contains dozens of programmable components, each requiring analysis against thousands of documented vulnerabilities across different databases. The system must also process complex technical relationships between components to understand how vulnerabilities in one component might affect others, which creates additional computational challenges in vulnerability analysis.

Accordingly, there is a need for a technical solution that can efficiently process large volumes of vulnerability data and accurately identify relevant security threats for complex system components. Such a technical solution may need to interpret technical specifications of system components, search across multiple vulnerability databases, and determine the relevance of identified vulnerabilities based on technical context. The technical solution may need to have data processing capabilities that can understand component relationships, interpret various data formats, and provide real-time vulnerability analysis during the TARA process. Additionally, there is a need for the technical solution to integrate with existing security assessment frameworks while reducing the computational overhead and improving the accuracy of vulnerability identification.

Machine learning based methods demonstrate capabilities in code analysis, pattern recognition, and vulnerability detection. Among the machine learning methods, deep learning architectures including large language models (LLMs) are employed to process and understand complex technical descriptions and specifications. These machine learning models utilize neural network architectures with multiple layers to extract meaningful features from input data, enabling the model to extract the predict and relationships between system components and their potential vulnerabilities. The training of LLMs involves optimization algorithms that adjust the model's parameters to minimize prediction errors and improve accuracy in identifying relevant security vulnerabilities. The inventors have discovered, among other things, that by using machine learning, a vulnerability assessment system can effectively process natural language inputs, understand technical context, and make informed decisions about security vulnerabilities and appropriate mitigation strategies.

Examples, embodiments, aspects, and features provide, among other things, an apparatus, method, and system for updating a computer system security analysis framework and performing a vulnerability analysis during a cybersecurity assessment.

According to some aspects one example provides an apparatus for updating a computer system security analysis framework and performing a vulnerability analysis during a cybersecurity assessment. The apparatus includes an electronic processor configured to identify one or more assets associated with a security analysis target that includes a security analysis framework by scanning a target system architecture and a plurality of security-relevant components, where the security analysis target is operated using the target system architecture. The electronic processor is also configured to execute a large language model to process the identified one or more assets by generating a search pattern based on a technical context of the identified one or more assets, selecting a relevant vulnerability based on the search pattern, and determining a mitigation strategy based on the relevant vulnerability. The electronic processor is also configured to and update the security analysis framework by adding the relevant vulnerability and the mitigation strategy into the security analysis framework.

Another example provides a computer-implemented method for updating a computer system security analysis framework and performing a vulnerability analysis during a cybersecurity assessment. The method includes identifying, via an electronic processor, one or more assets associated with a security analysis target that includes a security analysis framework by scanning a target system architecture and a plurality of security-relevant components, where the security analysis target is operated using the target system architecture; executing, via the electronic processor, a large language model to process the identified one or more assets by: generating a search pattern based on a technical context of the identified one or more assets, selecting a relevant vulnerability based on the search pattern (400), and determining a mitigation strategy based on the relevant vulnerability; and updating, via the electronic processor, the security analysis framework by adding the relevant vulnerability and the mitigation strategy into the security analysis framework.

Another example provides a non-transitory computer-readable medium storing computer executable instructions that, when executed, cause a computer to identify one or more assets associated with a security analysis target that includes a security analysis framework by scanning a target system architecture and a plurality of security-relevant components, where the security analysis target is operated using the target system architecture; execute a large language model to process the identified assets by generating a search pattern based on a technical context of the identified one or more assets, selecting a relevant vulnerability based on the search pattern, and determining a mitigation strategy based on the relevant vulnerability; and update the security analysis framework by adding the relevant vulnerability and the mitigation strategy into the security analysis framework.

DESCRIPTION OF THE DRAWINGS

FIG. 2 shows an example of a structured list of assets according to some aspects.

Figure 1:
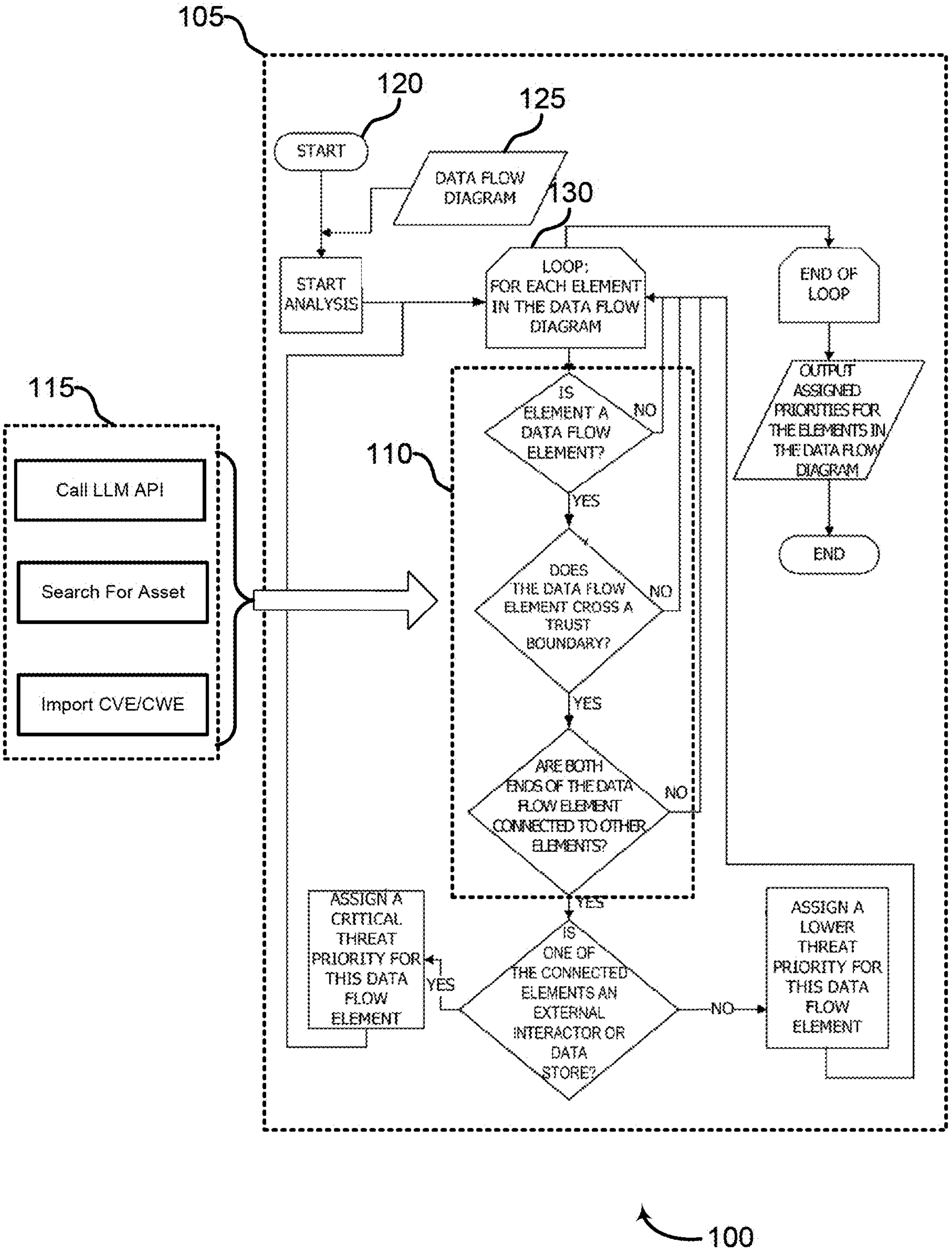
FIG. 1 illustrates an example of a cybersecurity threat analysis and risk assessment process.

Skilled artisans will appreciate that elements in the figures are illustrated for simplicity and clarity and have not necessarily been drawn to scale. For example, the dimensions of some of the elements in the figures may be exaggerated relative to other elements to help improve understanding of examples of the present disclosure.

The system, apparatus, non-transitory computer-readable medium, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION

As noted, many existing TARA processes face challenges in efficiently processing and analyzing the vast amount of security vulnerability information available across multiple databases. For example, security analysts need to manually search through numerous databases to identify relevant vulnerabilities for each system component, a process that is time-consuming and potentially error prone. The vulnerability identification and analysis involving the manual search and analysis often leads to inconsistent results, missed security threats, and inefficient use of technical resources. Furthermore, while a machine-based approach for search and identification may be desirable, the growing complexity of modern systems, with their numerous interconnected components, makes it challenging to develop a machine-based approach for comprehensive and up-to-date security assessments.

Examples, embodiments, aspects and features address, among other things, some of these challenges by implementing a real-time vulnerability analysis system that integrates large language model (LLM) technology into the TARA process. The system automates and enhances the vulnerability identification process by employing natural language processing to understand the technical context of system components and generate intelligent search patterns. This approach leads to automated querying of multiple security databases simultaneously, with the LLM filtering and selecting relevant vulnerabilities based on component context. The system's ability to automatically match appropriate mitigation strategies to identified vulnerabilities significantly reduces analysis time and improves consistency. By automating these critical aspects of the TARA process, efficiency is increased, and more comprehensive security coverage is achieved through a more systematic analysis and verification of all system components.

Some examples incorporate machine learning techniques, where computational models learn patterns and relationships from training data to make intelligent decisions. In the context of security vulnerability analysis, these machine learning models are trained on datasets comprising historical vulnerability records, security assessments, and technical documentation. The training process may involve supervised learning, where the models learn from labeled examples of vulnerabilities and their corresponding system components, as well as unsupervised learning to identify underlying patterns in security data.

In the following, various examples, embodiments, aspects, and features are described. However, it is to be understood that the examples, embodiments, aspects, and features may be implemented in different forms and used with different tool sets. The figures presented are not necessarily to scale; some details may be minimized or simplified to show the major steps along the way. Therefore, specific steps disclosed herein are not to be interpreted as limiting, as it can vary depending on the different tool sets that are used as well as the LLM that is selected.

In the following, examples of a mitigation strategy include recommended security measures and corrective actions designed to address identified vulnerabilities. These strategies include technical controls, security configurations, implementation guidelines, and remediation steps that can be applied to protect the asset from potential security threats. A mitigation strategy may encompass various aspects such as system hardening requirements, security control implementations, configuration changes, or architectural modifications needed to reduce or eliminate security risks. The strategy provides actionable guidance for implementing security improvements while considering the asset's technical constraints and operational requirements.

Examples of a security analysis target include a specific system, component, or collection of components selected for security evaluation through the TARA process. This target can encompass hardware elements (such as processors, sensors, communication modules), software elements (such as operating systems, applications, protocols), or combinations thereof. The target is defined by its technical specifications, operational parameters, system boundaries, and interconnections with other components. When a user initiates the security analysis process, they specify this target, which serves as the scope boundary for subsequent vulnerability analysis.

Examples of a security assessment framework include a structured system for organizing, evaluating, and managing security-related information about a target system. This framework includes defined security policies and requirements, documented system architecture and component relationships existing security controls and measures known vulnerabilities and their status implemented mitigation strategies, security risk assessments and metrics, compliance requirements and standards, security monitoring and maintenance procedures.

Examples of a search pattern include a structured query format generated to identify relevant security vulnerabilities for a given asset. These patterns are derived from the asset's technical context and are designed to effectively search security databases for applicable vulnerabilities. In some instances, a search pattern includes key technical identifiers, component relationships, architectural characteristics, and operational parameters that help identify potential security weaknesses. In some instances, the pattern incorporates multiple search criteria such as component identifiers, version numbers, architectural frameworks, and known vulnerability categories that could affect the asset's security posture.

Examples of a vulnerability include a weakness or flaw in a system component that may be exploited to compromise the system's security. For example, vulnerabilities include design flaws in processors or memory systems that may allow unauthorized access or manipulation. Software vulnerabilities often include coding errors, insecure configurations, or outdated components that create security weaknesses. System architecture vulnerabilities may include unsecured communication channels, improper segregation of critical components, or inadequate security boundary definitions. Operational vulnerabilities may emerge from weak authentication mechanisms, insufficient access controls, or inadequate security protocols. These vulnerabilities represent potential points of failure in the system's security that could allow unauthorized access, data breaches, or system compromise.

Examples of a user include human operators such as test engineers or security analysts. The user may also include automated systems, computer programs, security tools, or any entity capable of interfacing with and utilizing the threat modeling system for performing the TARA process.

Examples of elements in a data flow diagram include specific components, processes, data stores, external entities, and interconnections that comprise the application's architecture and data flow paths. These elements represent distinct points where data is processed, stored, transmitted, or accessed within an application program.

FIG. 1 illustrates an example of a cybersecurity threat analysis and risk assessment process 100. The cybersecurity threat analysis and risk assessment process 100 is implemented by a computer system (not shown). In the description that follows when a statement indicating that the process performs an act it should be understood that the computer system carries out or causes the act to be performed. The cybersecurity threat analysis and risk assessment process 100 includes a baseline process 105 and a vulnerability mitigation process 115. The vulnerability mitigation process 115 includes, for example, an API call to an LLM, a search operation, and an import operation. The baseline process 105 includes a baseline asset identification process 110. The vulnerability mitigation process 105115 enhances the baseline process 105 by incorporating the LLM for assets identification and analysis. An example of the vulnerability mitigation process 115 is a TARA process 700 illustrated in FIG. 7.

Figure 5:
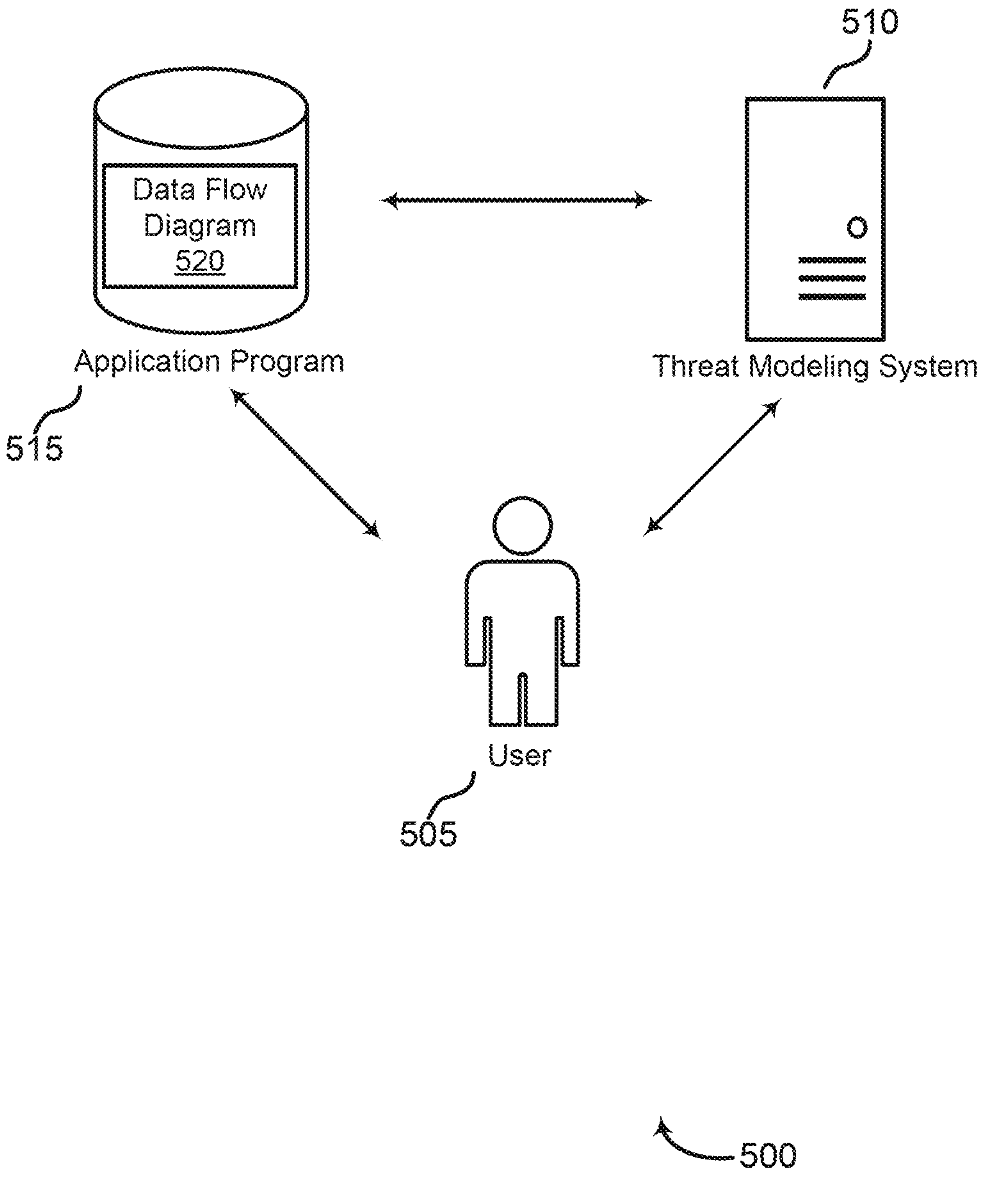
FIG. 5 illustrates an example of an information system according to some aspects.

The baseline process 105 begins at a start block 120 by accessing a data flow diagram 125 that describes the operation of the application program. After start analysis, the baseline process 105 enters a loop 130. In the loop 130, each element in the data flow diagram is analyzed. The data flow diagram represents a structured description of the application program's components and the interactions between the components. The application program and a data flow diagram are also illustrated in FIG. 5 as application program 515 and data flow diagram 520.

Within the loop 130 the baseline process 105 first evaluates if the element is a data flow element. If confirmed, the baseline process 105 proceeds to check if the data flow element crosses a trust boundary. A trust boundary represents transitions where trust levels change, such as between anonymous and authenticated users, or between system and kernel operations.

When a trust boundary is crossed, the baseline process 105 checks if both ends of the data flow element are connected to other elements. Following confirmation of connectivity, the baseline process 105 evaluates if one of the connected elements is an external interactor or data store. Based on this evaluation, the baseline process 105 either proceeds to assign a critical threat priority for this data flow element or assign a lower threat priority for this data flow element.

This analysis continues until end of loop 130 is reached, after all elements have been evaluated. The final stage produces output assigned priorities for the elements in the data flow diagram before reaching end. The assigned priorities indicate potential vulnerabilities in the application program, which can be visually distinguished through methods such as highlighting or color coding, where critical threats and lower priorities are represented differently.

In the baseline asset identification process 110, the decision sequence begins by determining if the element is a data flow element. This initial check filters the analysis to focus specifically on elements that represent data transmission or flow within the system.

If the element is confirmed as a data flow element, the baseline process 105 then evaluates whether this data flow element crosses a trust boundary. Trust boundaries occur when data moves between different trust levels, such as when data transitions from less-to-more or more-to-less trusted environments. Examples of trust boundaries include communications between a web application and a database server, data flow between user mode and kernel mode, interactions between authenticated and unauthenticated system components, data transmission across perimeter firewalls, and movement of data between business components and data access components.

If a trust boundary crossing is confirmed, the baseline process 105 then checks whether both ends of the data flow element maintain connections to other elements. This connectivity check helps to ensure the data flow is part of a complete pathway rather than an isolated or incomplete connection.

Following these validations, the final decision point evaluates whether any of the connected elements qualifies as an external interactor or data store. An external interactor might be an external data source communicating with the application program. The threat priority assignment is then determined and checked. If confirmed, the baseline process 105 assigns a critical threat priority to the data flow element. If not confirmed, the baseline process 105 assigns a lower threat priority to the data flow element.

The cybersecurity threat analysis and risk assessment process 100 illustrated in FIG. 1 involves steps of identifying and analyzing system assets. According to some aspects, this identification and analysis step includes obtaining a structured list of assets for potential security vulnerabilities analysis. FIG. 2 shows an example of a structured list of assets 200. FIG. 2 demonstrates how the asset identification and analysis step catalogs various system components and the components' corresponding security requirements.

In this example, the structured list of assets 200 indicate multiple configuration elements and interfaces of the system that need to be evaluated for potential security vulnerabilities. The structured list of assets 200 includes multiple types of system configurations, such as External Ethernet Configuration (Asset-1) and HSM Keystore (Asset-4). The HSM (Hardware Security Module) Keystore (Asset-4) refers to a secure storage area within a dedicated hardware security module that stores and protects cryptographic keys and other sensitive security parameters. Each asset is assigned specific security properties. As shown in FIG. 2, some asset requires "Integrity" verification, while some assets require additional security properties including "Confidentiality" and "Availability."

The structured list of assets 200 demonstrates the complexity of modern system security analysis. For example, a single component contains numerous assets requiring individual security evaluation. Each identified asset may need to be analyzed against known vulnerabilities in security databases, which highlights the need for efficient automated analysis methods in the TARA process.

Figure 3:
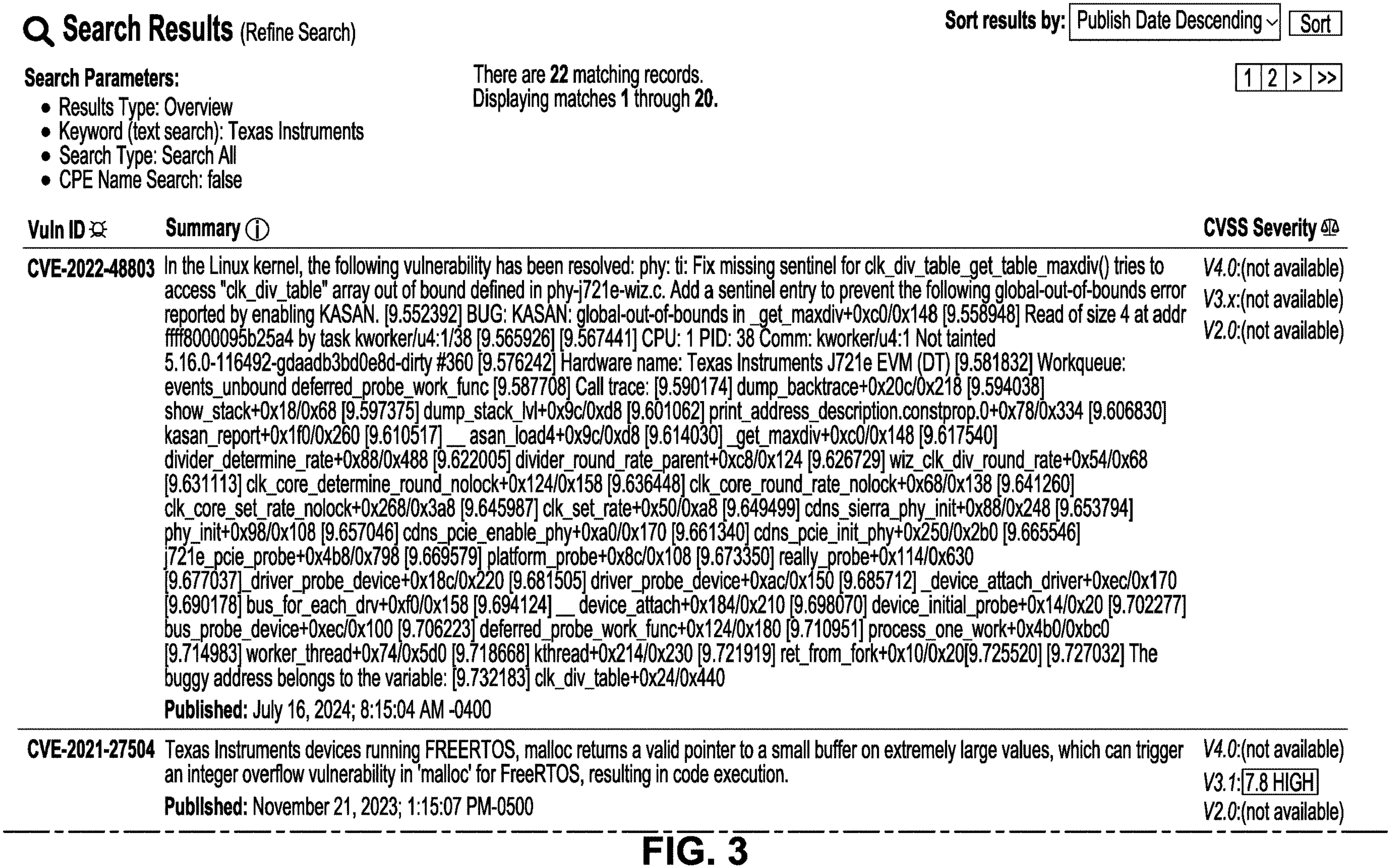
FIG. 3 shows results of a vulnerability search according to some aspects.

After obtaining the structured list of assets 200 as shown in FIG. 2, the cybersecurity threat analysis and risk assessment process 100 requires searching for known security vulnerabilities associated with these assets. FIG. 3 illustrates the vulnerability search results 300. FIG. 3 demonstrates how security analysts search for CVE and CWE information in security databases.

The vulnerability search results 300 include search results from a vulnerability database interface, where analysts can query for specific security vulnerabilities. Additionally, this search process may require analysts to manually examine multiple databases, for example, up to 50 different sources including government databases, research institutions, and regional security repositories. Each database may contain different vulnerability information, requiring comprehensive searches across all sources to ensure complete coverage.

The vulnerability search results 300 thus shows how a single component search can yield multiple potential vulnerabilities. The results include detailed vulnerability descriptions, publication dates, and severity ratings for each identified security concern. These search results then need to be analyzed to determine their relevance to the specific system implementation and potential impact on system security.

The complexity of this search process highlights a challenge in existing TARA method, that is, the need to efficiently process large volumes of vulnerability data across multiple databases while maintaining accuracy in identifying relevant security threats. This challenge becomes particularly significant when analyzing complex systems with numerous components, each requiring its own comprehensive vulnerability assessment.

Figure 4:
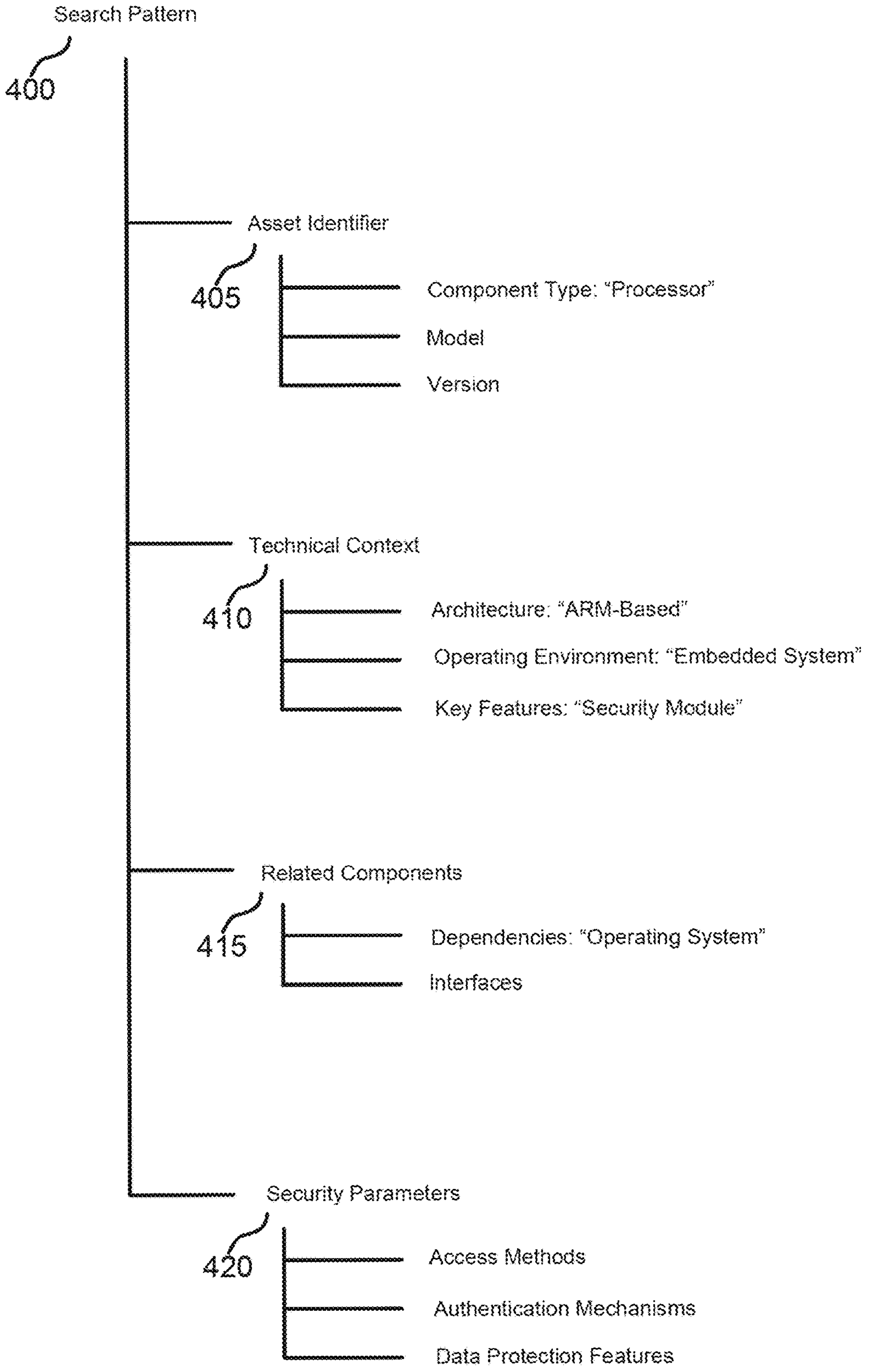
FIG. 4 illustrates an example of a search pattern according to some aspects.

While FIG. 3 shows the results of vulnerability search, FIG. 4 illustrates an example of search pattern 400 that are used to enhance the search process according to some aspects. A search pattern may include a structured query framework that organizes information about an asset to facilitate vulnerability searches.

Referring to the example shown in FIG. 4, the search pattern 400 is a structured query framework that includes the asset identifier 405, the technical context 410, the related components 415, and the security parameters 420.

The asset identifier 405 specifies fundamental identification elements such as the component type, specific model designation, and version information. The asset identifier 405 functions as a baseline for initial vulnerability matching.

The technical context 410 expands this foundation by incorporating the asset's architectural framework, operational environment, and key technical features. By using the technical context 410, the vulnerability analysis is conducted based on the asset's implementation characteristics.

The related components 415 establishes the asset's position within the broader system architecture by documenting dependencies and interfaces with other system elements. In some examples, this relational mapping is used to identify vulnerabilities that affects the asset through the vulnerabilities' interactions with connected components.

The security parameters 420 determines security-relevant characteristics such as access methods, authentication mechanisms, and data protection features. The security parameters 420 thus are used to identify vulnerabilities specific to the asset's security implementation.

The search pattern 400 thus using the structured query framework to form a search pattern that guides the LLM in identifying relevant vulnerabilities by matching against known security weaknesses in the vulnerability databases. Using the pattern's structured organization, the machine implemented searches consider not only direct matches based on asset identifiers but also contextual and relationship-based vulnerabilities that might affect the asset's security posture.

FIG. 5 illustrates an example of an information system 500 that implements an asset identification and analysis process. The information system 500 includes a threat modeling system 510 and an application program 515 that includes data flow diagram 520. In some instances, the information system 500 operates in interaction with a user 505. The information system 500 identifies and analyzes potential security vulnerabilities within the application program 515. In this example, the user 505 interacts with the threat modeling system 510 to conduct security analyses of software applications and their components. The user 505 includes human operators such as test engineers or security analysts and automated systems, computer programs, security tools, or another entity capable of interfacing with and utilizing the threat modeling system for performing the TARA process.

In this example, the threat modeling system 510 includes an analytical engine. An example of the analytical engine is further illustrated as the large language model 615 in FIG. 6. In some examples, the threat modeling system 510 employs predefined security criteria to evaluate application programs and identify potential security threats. Through automated analysis capabilities, the threat modeling system 510 processes complex application structures and highlights areas requiring security attention, providing the user 505 with detailed insights into potential vulnerabilities.

An application program 515 including the data flow diagram 520 form the target of security analysis. The data flow diagram 520 included in the application program 515 includes a structured representation of data movement and processing within the application. The elements may represent distinct points where data is processed, stored, transmitted, or accessed within the application program 515.

For example, through systematic examination of these elements, the threat modeling system 510 identifies potential security threats by analyzing how data flows between elements and where vulnerabilities may exist. The elements identified within the data flow diagram 520 as potential security threats can subsequently be utilized as fuzz targets for comprehensive security testing, allowing the user 505 to conduct targeted vulnerability assessments.

Figure 6:
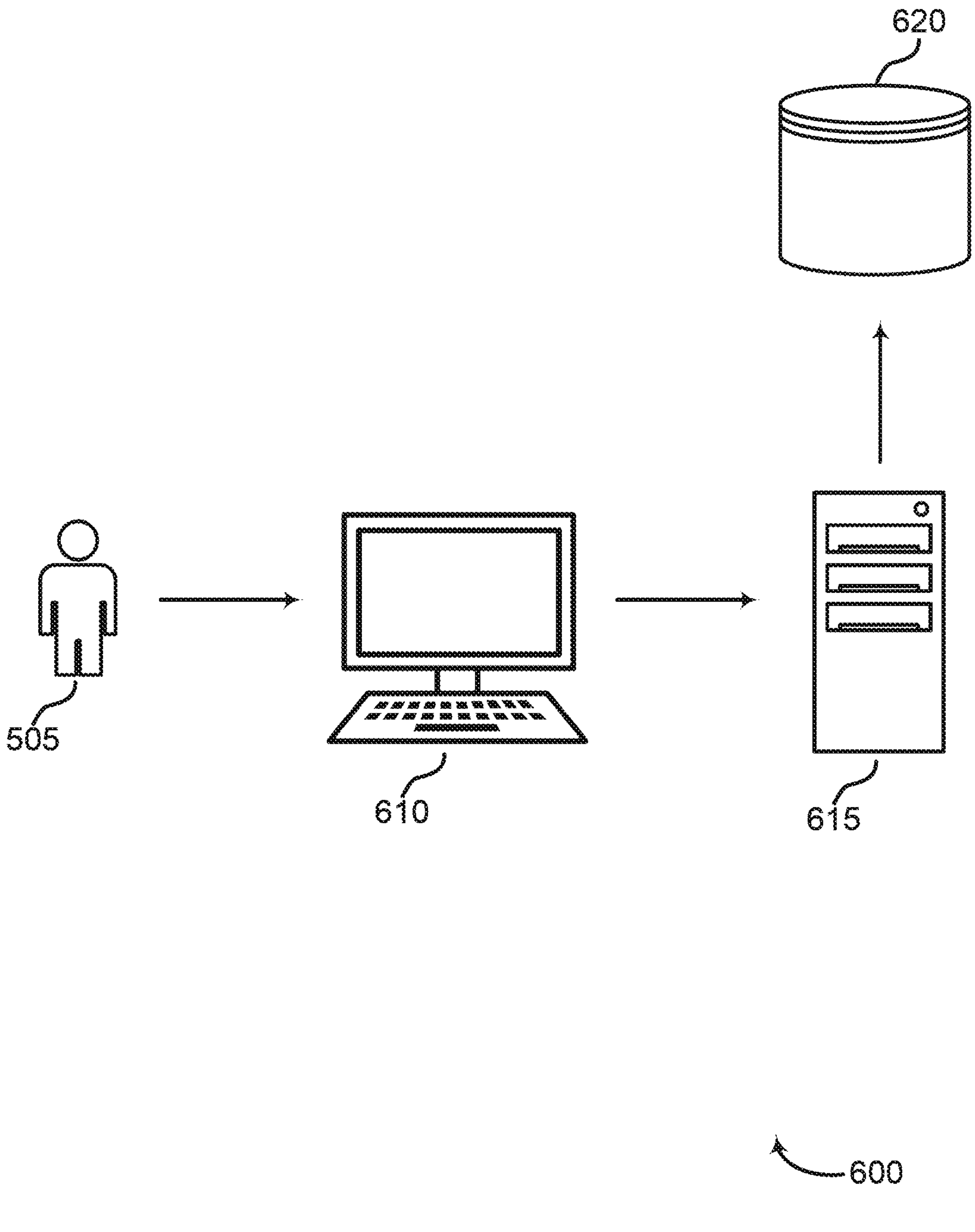
FIG. 6 illustrates an example of risk identification and analysis system according to some aspects.

FIG. 6 illustrates an example of risk identification and analysis system 600. The risk identification and analysis system 600 may be an example of the threat modeling system 510.

In FIG. 6, a TARA tool 610 provides an interface through which security analysis is conducted. In some instances, the TARA tool 610 exists in various versions created by different security tool providers, offering flexibility in implementation across different security environments. Through the TARA tool 610, the user 505 initiates the automated vulnerability assessment process through an initiation step (for example, the initiation step 705 illustrated in FIG. 7). Following a process start step (for example, the process start step 710 illustrated in FIG. 7), the TARA tool 610 executes an asset identification step (for example, the asset identification step 715 illustrated in FIG. 7) and proceeds with subsequent analysis operations.

In one example, large language model 615 functions as a processing component of the system. The large language model 615 interfaces with the TARA tool 610 to perform vulnerability searches and analysis during an LLM analysis step (for example, LLM analysis step 720 illustrated in FIG. 7). After asset identification, the large language model 615 conducts comprehensive searches across selected data repositories to collect relevant CVE and CWE records. In some instances, the large language model 615 includes an artificial intelligence model trained on datasets and is configured to process natural language queries about security vulnerabilities. In some instances, the large language model 615 interprets queries about software and hardware components. In some instances, the large language model 615 also searches across multiple vulnerability databases and outputs relevant security information in a structured format. For example, when analyzing a system component such as a microcontroller or operating system, the large language model 615 utilizes multiple technical specifications, versions, and configurations to identify pertinent vulnerabilities, going beyond simple keyword matching to recognize the context and relationships between different security threats.

As noted, some examples incorporate machine learning techniques, where computational models learn patterns and relationships from training data to make intelligent decisions. In some examples, these machine learning models are trained on datasets comprising historical vulnerability records, security assessments, and technical documentation. The training process involves supervised learning, where the models learn from labeled examples of vulnerabilities and their corresponding system components, as well as unsupervised learning to identify underlying patterns in security data. The training process involves optimization algorithms that adjust the model's parameters to minimize prediction errors and improve accuracy in identifying relevant security vulnerabilities. By using machine learning, the system is trained to process natural language inputs while considering technical context, and output decisions about security vulnerabilities and appropriate mitigation strategies.

In some instances, the repository database 620 is a knowledge source for vulnerability information and mitigation strategies. For example, the repository database 620 includes various vulnerability databases, with access determined by specific search requirements and authorization levels. The repository database 620 supplies the large language model 615 with vulnerability data and associated mitigation suggestions. In a data integration step (for example, the data integration step 725 illustrated in FIG. 7), the discovered vulnerabilities and mitigation strategies are incorporated into the TARA tool 610. This process continues through an asset verification decision step (for example, asset verification decision step 730 illustrated in FIG. 7) until reaching a completion step (for example completion step 735 illustrated in FIG. 7), enabling the user 505 to conduct detailed analysis and develop appropriate security measures.

In some instances, the repository database 620 is a collection of vulnerability databases that contain documented security weaknesses, exposures, and their corresponding mitigation strategies. In some instances, the repository database 620 includes the national vulnerability database, CVE database, national-level security databases, and vendor-specific vulnerability databases. For example, when analyzing a component like a processor, the repository database 620 includes entries from a government's database, some national security databases, and the processor's own vulnerability disclosures. Access to these repositories is controlled based on authorization levels and specific security requirements, ensuring coverage while maintaining appropriate access controls.

Figure 7:
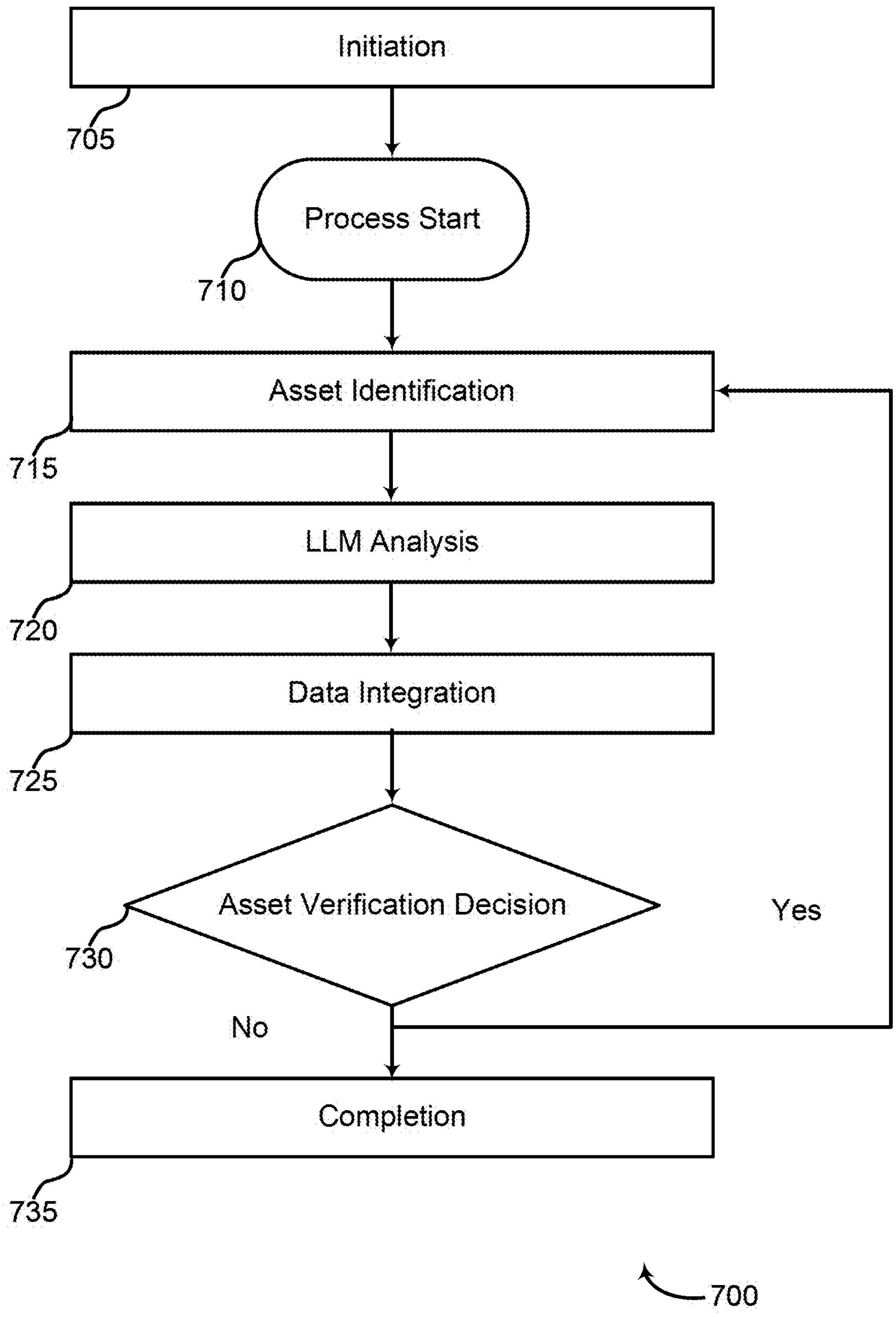
FIG. 7 illustrates an example of a TARA process according to some aspects.

FIG. 7 illustrates a TARA process 700 according to some examples. The TARA process 700 may be implemented using risk identification and analysis system 600. As noted above, the TARA process 700 begins with initiation step 705, where a user input triggers the analysis sequence. For example, this input takes the form of clicking a "Generate" button within the TARA tool interface. The user action serves as the initial data point, transforming a manual interaction into a system command that launches the automated analysis process.

The process start step 710 activates the system's core functionality, transitioning from the user input state to an active processing state. During this initialization phase, the system allocates computational resources, establishes secure connections to vulnerability databases, and loads the large language model infrastructure. For example, the system initializes memory buffers for data processing, authenticate access credentials for various security databases, and prepare the analysis pipeline for handling multiple asset types simultaneously.

The asset identification step 715 transforms the initial set of assets as identified in the TARA's asset list of the target system into a formatted, structured list of elements that will be used as input to the LLM analysis step 720. The assets identified in the TARA include hardware assets, complex software assets and multiple sensor systems. Additionally, supporting assets such as encryption modules, communication protocols, open-source software as well as third-party software and any security-critical data structures can be included. In some examples, each asset in the TARA's asset list is identified with specific versioning information, deployment context and interconnection details to ensure precise vulnerability matching in subsequent steps. For instance, a single automotive electronic control unit (ECU) yields several distinct assets, each requiring an independent security analysis of the distinct assets. The asset identification step 715 is performed iteratively for each asset until all assets are evaluated via the electronic processor 805 by using the asset identification program 825 illustrated in FIG. 8

The LLM analysis step 720 takes the identified assets from step 715 as input and transforms the identified assets into search queries (e.g., prompts) for vulnerability analysis. For example, the prompt is structured as "What are the CVEs and related CWEs for [asset] that you are aware of today. Provide the list in [identifier] order." In this example, the placeholders [asset] and [identifier] are variables that are replaced with terms provided by the user or derived from the context of the prompt. The LLM model is called in a batch process to the API for the selected AI model such as gpt-4o from OpenAI. The large language model employs natural language processing to process the technical context of each asset and generate comprehensive search patterns. For example, when analyzing a processor, the LLM searches architecture-specific vulnerabilities (such as ARM-based processor vulnerabilities), component-specific issues (such as memory controller weaknesses, cache vulnerabilities), and system-level security concerns (such as boot sequence vulnerabilities, secure storage implementations). It should be noted however, that given the nature of LLM processing, the most reasonable results will be returned which will require further validation to confirm the accuracy of the confirmed dataset. The LLM analysis step 720 is performed via the electronic processor 805 by using the LLM analysis program 830 illustrated in FIG. 8.

The data integration step 725 transforms the collected vulnerability data into a structured format compatible with the TARA tool. This data is then imported into the TARA tool where each retrieved CVE/CWE is associated to the related asset. The CVE/CWE data is then determined to be included in or excluded from the risk model. In some examples, when the information is excluded from the risk model, a justification for the exclusion is given in the TARA tool to support verification and validation capabilities. In some examples, CWEs that identify the mitigation strategies are structured in the TARA tool into implementable actions. In some examples, when multiple vulnerability databases are consulted, the data integration step 725 include normalizing vulnerability information from different database formats into a standardized structure including mapping the severity ratings across different scoring methodologies. For example, when processing a discovered vulnerability, the data integration step 725 extracts the technical details of the security weakness, convert the threat description into the TARA tool's required format, associates it with a specific asset, then links the information to the relevant mitigation strategies. In some examples, the data integration step 725 normalizes duplicate findings from multiple sources, resolves conflicting severity ratings, and creates relationships between interconnected vulnerabilities. By using the structured integration, the data integration step 725 navigates and utilizes the discovered vulnerability information within an established workflow. In one example, the data integration step 725 is performed via the electronic processor 805 by using the data integration program 835 illustrated in FIG. 8.

The asset verification decision step 730 processes the integrated data to determine if additional assets require analysis. This decision point implements a verification algorithm that evaluates multiple criteria. In one example, first, it checks if all identified primary assets from the initial inventory have been processed. Second, it examines if the vulnerability analysis of current assets has revealed additional dependent or connected assets that require security evaluation. For example, if the analysis of a processor reveals a vulnerability related to its interaction with external memory components, these memory components would be flagged as additional assets requiring analysis. Third, it verifies if any discovered CVEs or CWEs have implications for other system components not initially identified.

In one instance, when the asset verification decision step 730 determines "Yes" (indicating additional assets require analysis), the process loops back to the asset identification step 715. This loop helps to ensure coverage of the entire system's security landscape. For instance, the analysis of a vehicle's radar system may reveal dependencies on specific signal processing libraries, which would then be added to the asset inventory for analysis. Each iteration through this loop enriches the security assessment by capturing increasingly detailed layers of the system architecture and their associated vulnerabilities.

When the outcome of the asset verification decision step 730 is "No,", the process advances to completion step 735. At this stage, the system has built a vulnerability and mitigation profile for the identified assets and their dependencies. The completion step 735 then consolidates all findings into a comprehensive TARA work product. In one example, the final document includes: an asset inventory with associated vulnerabilities, detailed CVE/CWE mappings for each component, risk assessments based on discovered vulnerabilities, prioritized mitigation strategies, and relationship mappings showing how different vulnerabilities and assets interconnect within the system architecture. The output provides security engineers with actionable intelligence for implementing system-wide security improvements. In one example, the asset verification decision step 730 is performed via the electronic processor 805 by using the asset verification program 840 illustrated in FIG. 8.

The completion step 735 represents the final transformation, where collected and analyzed data is consolidated into a comprehensive TARA work product. In one example, this step transforms the accumulated analysis results into a formatted security assessment document within the toolset, providing a vulnerability analysis and mitigation strategy for all identified assets. The completion step 735 is performed by the TARA work product generation program 845 illustrated in FIG. 8.

Figure 8:
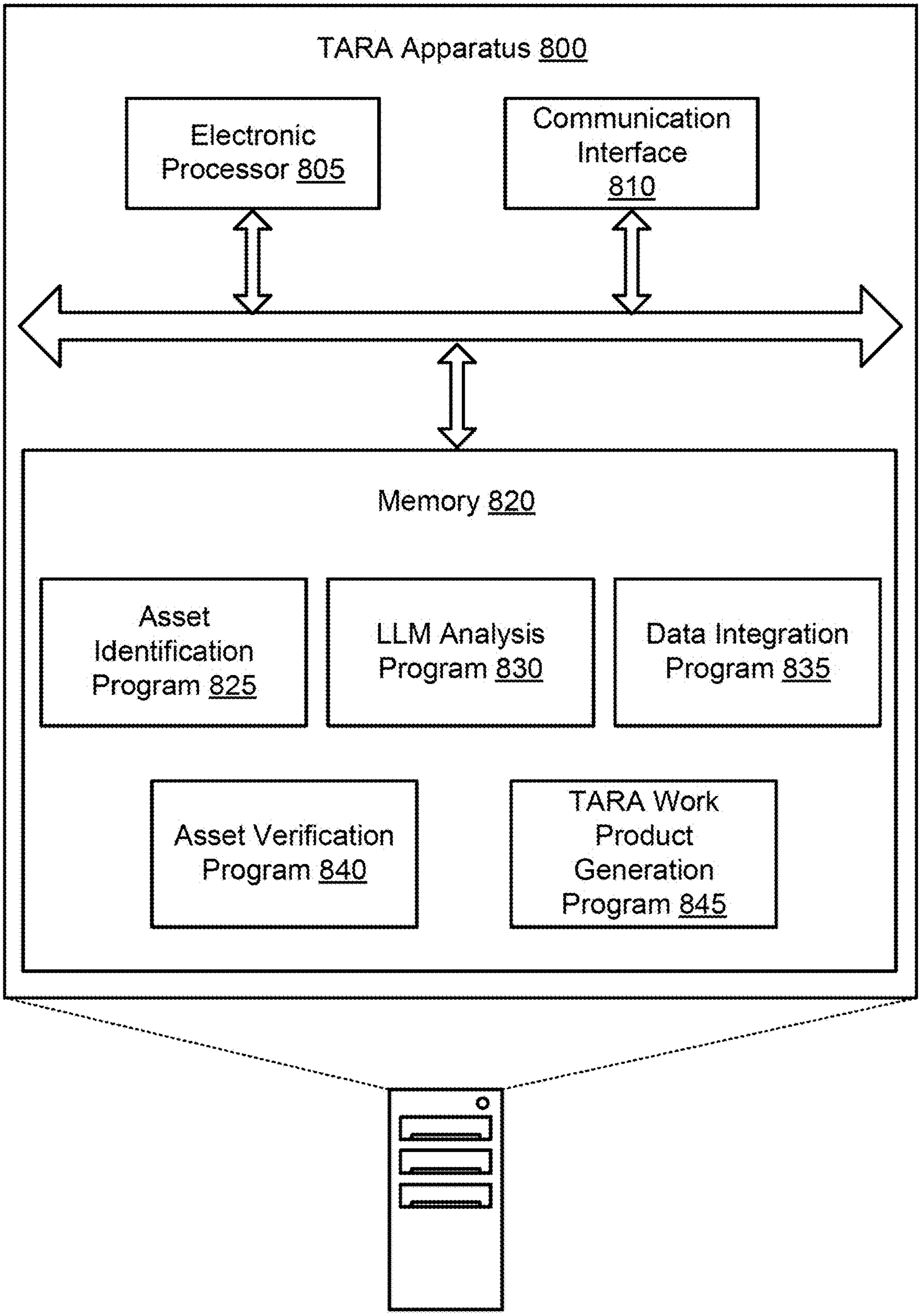
FIG. 8 illustrates an example of a TARA system according to some aspects.

FIG. 8 illustrates a TARA apparatus 800 according to some examples. In the example shown, the TARA apparatus 800 includes electronic processor 805, communication interface 810, and memory 820. The memory 820 includes the asset identification program 825, the LLM analysis program 830, the data integration program 835, the asset verification program 840, and the TARA work product generation program 845. The TARA apparatus 800 may be included in the risk identification and analysis system 600.

The electronic processor 805 may include a hardware device, such as a general-purpose processor, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some examples, electronic processor 805 is configured to operate a memory array using a memory controller. In other examples, a memory controller is integrated into the electronic processor 805. In some examples, the electronic processor 805 is configured to execute computer-readable instructions stored in the memory 820 to perform various functions. In some aspects, the electronic processor 805 includes special purpose components for modem processing, baseband processing, digital signal processing, or transmission processing.

The communication interface 810 manages the flow of information between the computer system and external devices or users. For example, communication interface 810 handles input from devices such as keyboards, mice, or microphones, and manages output to displays, speakers, or other peripherals. In some examples, communication interface 810 includes a user interface component. The communication interface 810 may include a user interface configured to receive user input indicating the security analysis target, and the user interface may include an access to a threat analysis and risk assessment toolset including a user control button.

The memory 820 includes one or more non-transitory memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of electronic processor 805 to perform various functions described herein.

In some examples, the memory 820 includes a basic input/output system (BIOS) that controls basic hardware or software operations, such as an interaction with peripheral components or devices. In some examples, the memory 820 includes a memory controller that operates memory cells of the memory 820.

The asset identification program 825, the LLM analysis program 830, the data integration program 835, the asset verification program 840, and the TARA work product generation program 845 may be configured to perform functions described above with reference to FIGS. 6-7.

Figure 9:
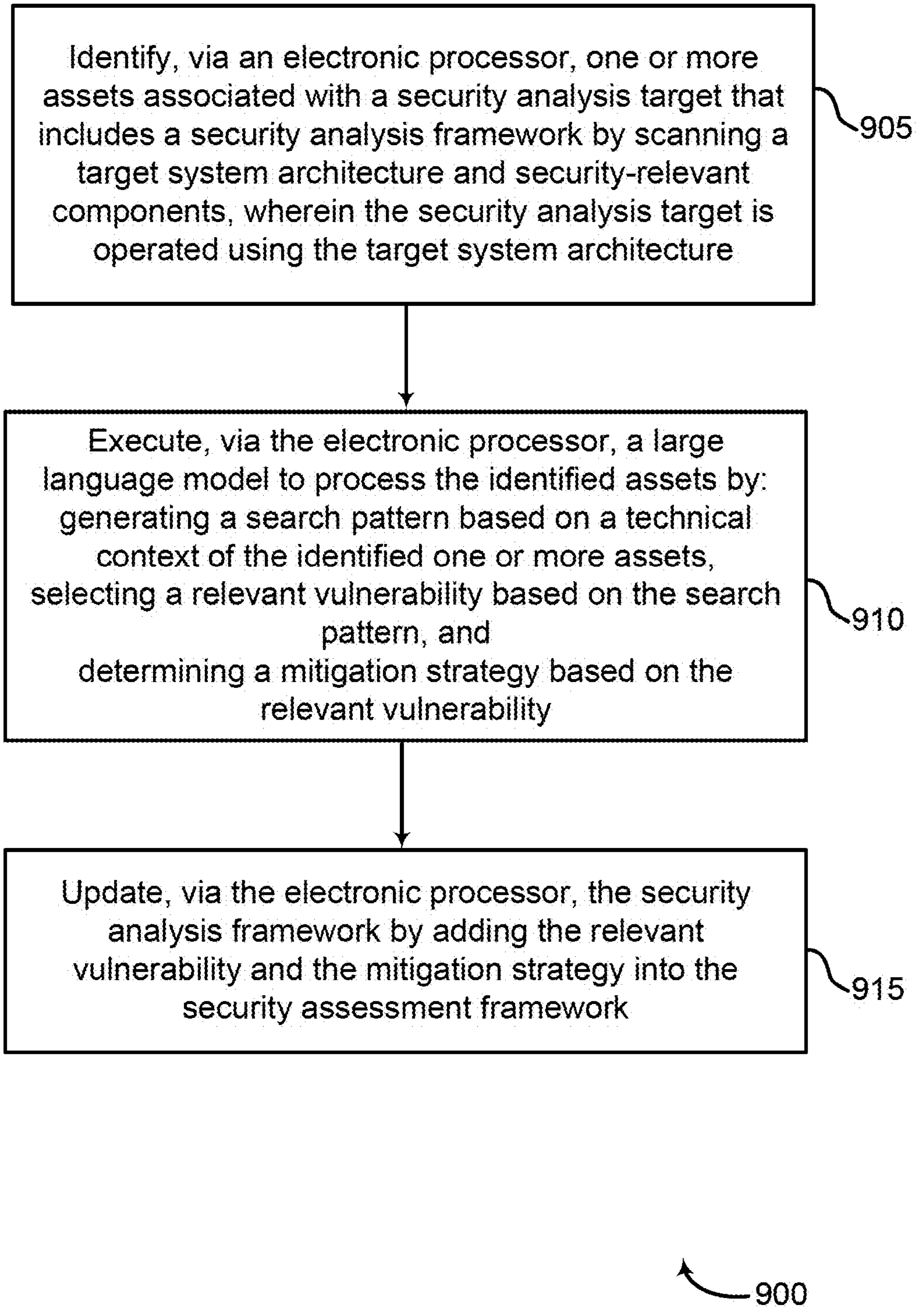
FIG. 9 illustrates an example of a computer-implemented TARA method according to some aspects.

FIG. 9 illustrates an example of a computer-implemented TARA method 900 according to some examples. The computer-implemented TARA method 900 may be implemented by the TARA apparatus 800.

Referring to FIG. 9, at operation 905, the TARA apparatus 800 identifies one or more assets associated with a security analysis target that includes a security analysis framework by scanning a target system architecture and security-relevant components. In one example the security analysis target is operated using the target system architecture.

In some examples, at operation 905, the TARA apparatus 800 identifies the one or more assets in response to a user input. For example, a user may activate a generate button within a threat analysis and risk assessment tool interface to trigger the initialization. Alternatively, the initialization may be triggered through automated scheduling mechanisms or system integration interfaces.

In these examples, at operation 905, the TARA apparatus 800 then initializes a vulnerability analysis process in response to user input. The initialization process involves setting up system resources, establishing secure connections to vulnerability databases, and preparing the analysis pipeline for processing multiple asset types simultaneously.

In these examples, at operation 905, the TARA apparatus 800 then scans the target system architecture, creating an inventory of security-relevant components, and cataloging each identified asset with specific version information and deployment context. For example, the identified assets may include hardware components such as processors, sensors, and communication modules, along with their specific model numbers and versions. The assets may also include software components such as operating systems, security modules, and communication protocols, each cataloged with their specific version information and deployment configurations.

At operation 910, the TARA apparatus 800 execute a large language model to process the identified assets by generating a search pattern based on a technical context of the identified one or more assets, selecting a relevant vulnerability based on the search pattern, and determining a mitigation strategy based on the relevant vulnerability. The large language model employs natural language processing to interpret the technical context of each asset and generate context-aware search patterns.

For example, the TARA apparatus 800 executes the large language model to process the identified assets by generating a search pattern based on a technical context of the identified one or more assets, selecting a relevant vulnerability based on the search pattern, and determining a mitigation strategy based on the relevant vulnerability.

For example, when analyzing security risks of a software implemented on a hardware component, the system may generate search patterns that include the software's architecture-specific vulnerabilities, the hardware's component-specific issues, and system-level security concerns. The system may query multiple security databases simultaneously, filter results based on relevance to the identified asset. In some examples, the large language model may expand the search scope to include related components and known vulnerability patterns.

At operation 915, the TARA apparatus 800 updates the security assessment framework by adding the relevant vulnerability and the mitigation strategy into the security assessment framework.

In some examples, the updating process involves normalizing vulnerability descriptions from different database formats, mapping severity ratings across different scoring systems, and organizing the mitigation strategies into implementable actions.

In some examples, the updating process may involve consolidating duplicate findings from multiple sources, resolving conflicting severity ratings, and creating relationships between interconnected vulnerabilities. For example, when processing a discovered vulnerability, the system normalizes the threat description into a standardized format, associates it with specific system components, and links it to relevant mitigation strategies. The integrated information is then structured to enable security analysts to efficiently navigate and utilize the discovered vulnerability information within their established workflow.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot register to push-to-talk communication networks, among other features and functions set forth herein).

In the foregoing specification, various examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if examples described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

The invention claimed is:

1. An apparatus for updating a computer system security analysis framework and performing a vulnerability analysis during a cybersecurity assessment, the apparatus comprising:

an electronic processor (805) configured to:

identify one or more assets associated with a security analysis target that includes a security analysis framework by scanning a target system architecture and a plurality of security-relevant components, wherein the security analysis target is operated using the target system architecture;

execute a large language model (615) to process the identified one or more assets by:

generating a search pattern (400) based on a technical context (410) of the identified one or more assets, selecting a relevant vulnerability based on the search pattern (400), and determining a mitigation strategy based on the relevant vulnerability; and update the security analysis framework by adding the relevant vulnerability and the mitigation strategy into the security analysis framework.

2. The apparatus of claim 1, wherein the electronic processor (805) is further configured to:

determine, based on the updated security analysis framework, whether an additional asset is associated with the security analysis target; and generate a security assessment work product when no additional assets are determined to be associated with the security analysis target.

3. The apparatus of claim 1, wherein the electronic processor (805) is further configured to:

catalog each security-relevant component with the technical context (410) to obtain a structured list of assets (200) associated with the security analysis target, wherein the technical context (410) includes version information and deployment context of the plurality of security-relevant component.

4. The apparatus of claim 1, wherein the electronic processor (805) is further configured to:

normalize a plurality of vulnerability descriptions from different database formats;

map a plurality of severity ratings across different scoring systems; and organize a plurality of mitigation strategies into an implementable action.

5. The apparatus of claim 1, wherein the electronic processor (805) is further configured to interpret the technical context (410) of the identified one or more assets using the large language model (615).

6. The apparatus of claim 1, wherein the electronic processor (805) is further configured to:

query a plurality of security databases simultaneously, and filter each of the plurality of security databases based on relevance to the identified one or more assets.

7. The apparatus of claim 1, further comprising:

a user (505) interface configured to receive user (505) input indicating the security analysis target, wherein the user (505) interface includes an access to a threat analysis and risk assessment toolset including a user (505) control button.

8. A computer-implemented method for updating a computer system security analysis framework and performing a vulnerability analysis during a cybersecurity assessment, comprising:

identifying, via an electronic processor (805), one or more assets associated with a security analysis target that includes a security analysis framework by scanning a target system architecture and a plurality of security-relevant components, wherein the security analysis target is operated using the target system architecture;

executing, via the electronic processor (805), a large language model (615) to process the identified one or more assets by:

generating a search pattern (400) based on a technical context (410) of the identified one or more assets, selecting a relevant vulnerability based on the search pattern (400), and determining a mitigation strategy based on the relevant vulnerability; and updating, via the electronic processor (805), the security analysis framework by adding the relevant vulnerability and the mitigation strategy into the security analysis framework.

9. The computer-implemented method of claim 8, further comprising:

determining, via the electronic processor (805), whether an additional asset is associated with the security analysis target based on the updated security analysis framework; and generating, via the electronic processor (805), a security assessment work product when no additional assets are determined to be associated with the security analysis target.

10. The computer-implemented method of claim 8, wherein identifying the one or more assets furthering comprising:

cataloging, via the electronic processor (805), each security-relevant component with the technical context (410) to obtain a structured list of assets (200) associated with the security analysis target, wherein the technical context (410) includes version information and deployment context of the security-relevant component.

11. The computer-implemented method of claim 8, wherein updating the security analysis framework further comprising:

normalizing, via the electronic processor (805), a plurality of vulnerability descriptions from different database formats;

mapping, via the electronic processor (805), a plurality of severity ratings across different scoring systems; and organizing, via the electronic processor (805), a plurality of mitigation strategies into an implementable action.

12. The computer-implemented method of claim 8, wherein executing the large language model (615) further comprising:

interpreting, via the electronic processor (805), the technical context (410) of the identified one or more assets using the large language model (615).

13. The computer-implemented method of claim 8, further comprising:

querying, via the electronic processor (805), a plurality of security databases simultaneously, and filtering, via the electronic processor (805), each of the plurality of security database based on relevance of the security database to the identified asset.

14. The computer-implemented method of claim 8, further comprising:

receiving, via a user (505) interface, user (505) input indicating the security analysis target, wherein the user (505) interface provides an access to a threat analysis and risk assessment toolset including a user (505) control button.

15. A non-transitory computer-readable medium storing computer executable instructions, the computer executable instructions, when executed, cause a computer to:

identify one or more assets associated with a security analysis target that includes a security analysis framework by scanning a target system architecture and a plurality of security-relevant components, wherein the security analysis target is operated using the target system architecture;

execute a large language model (615) to process the identified assets by:

generating a search pattern (400) based on a technical context (410) of the identified one or more assets, selecting a relevant vulnerability based on the search pattern (400), and determining a mitigation strategy based on the relevant vulnerability; and update the security analysis framework by adding the relevant vulnerability and the mitigation strategy into the security analysis framework.

16. The non-transitory computer-readable medium of claim 15, wherein the computer executable instructions, when executed, further cause the computer to:

determine, based on the updated security analysis framework, whether an additional asset is associated with the security analysis target; and generate a security assessment work product when no additional assets are determined to be associated with the security analysis target.

17. The non-transitory computer-readable medium of claim 15, wherein the computer executable instructions, when executed, further cause the computer to:

catalog each security-relevant component with the technical context (410) to obtain a structured list of assets (200) associated with the security analysis target, wherein the technical context (410) includes version information and deployment context of the plurality of security-relevant component.

18. The non-transitory computer-readable medium of claim 15, wherein the computer executable instructions, when executed, further cause the computer to:

normalize a plurality of vulnerability descriptions from different database formats;

map a plurality of severity ratings across different scoring systems; and organize a plurality of mitigation strategies into an implementable action.

19. The non-transitory computer-readable medium of claim 15, wherein the computer executable instructions, when executed, further cause the computer to:

interpret the technical context (410) of the identified one or more assets using the large language model (615).

20. The non-transitory computer-readable medium of claim 15, wherein the computer executable instructions, when executed, further cause the computer to:

query a plurality of security databases simultaneously, and filter each of the plurality of security databases based on relevance to the identified one or more assets.

* * * * *